May 14, 1963
S. J. PRZEKOP
3,089,301
LAWN MOWER HANDLE SUPPORT
Filed April 3, 1962
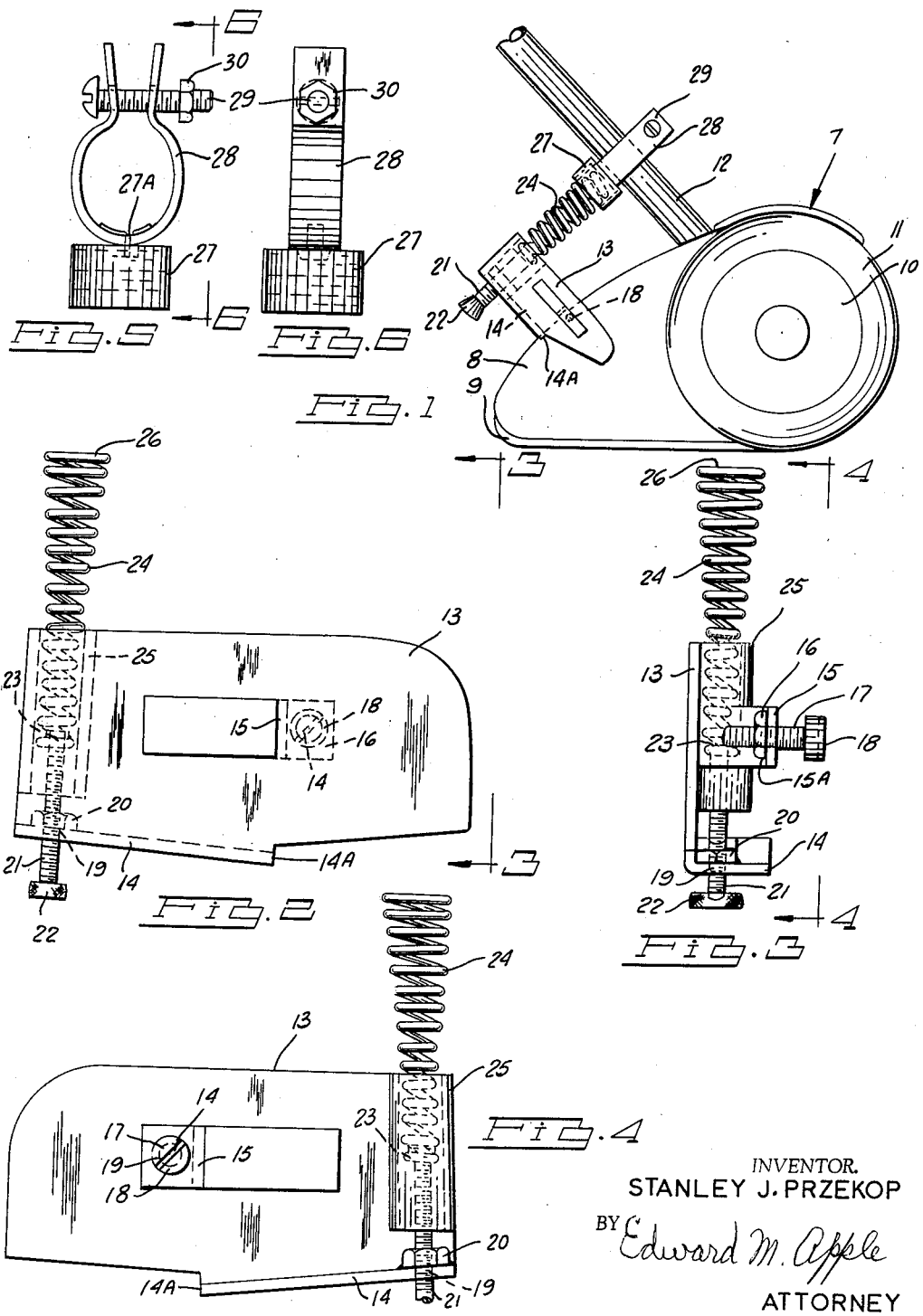
INVENTOR.
STANLEY J. PRZEKOP
BY Edward M. Apple
ATTORNEY United States Patent Office 3,089,301
Patented May 14, 1963

3,089,301
LAWN MOWER HANDLE SUPPORT
Stanley J. Przekop, 18199 Riopelle, Detroit, Mich.
Filed Apr. 3, 1962, Ser. No. 184,741
4 Claims. (Cl. 56—249)

This invention relates to lawn mowers and has particular reference to a device for resiliently supporting the handle in various degrees of angularity.

An object of the invention is to provide a device of the character indicated, which may be attached to any type of a manually guided lawn mower, whether it be old or new, reel or rotary, push-type or self-propelled.

Another object of the invention is to provide a device of the character indicated, which may be secured to the lawn mower, or detached therefrom, without using special tools.

Another object of the invention is to provide a device of the character indicated, which is constructed and arranged so that it will support the handle of the lawn mower at the proper height for the operator to do the most effective work, with a minimum of effort, and will prevent the handle from falling toward the ground when the operator's hands are removed from it.

Another object of the invention is to provide a device of the character indicated which is easily adjusted for various heights, and when in use will absorb the heavy shocks caused by uneven terrain.

Another object of the invention is to provide a device for angularly supporting the handle of the lawn mower when in use, but permits the handle to be moved to the vertical or other position for storage, and the like.

I am aware of the fact that other devices are known to the public, which are intended to provide shock absorbing characteristics for the handle, but such devices now known to the public are complicated, expensive to manufacture, difficult to attach, and do not have the feature of adjustment of my device. It is therefore another object of the invention to obviate such difficulties.

The foregoing and other objects and the advantages of the invention will become more apparent as the description proceeds, reference being made from time to time to the accompanying drawing, forming part of the within disclosure, in which drawing:

FIG. 1 is a fragmentary side elevational view of a lawn mower equipped with my device.

FIG. 2 is an enlarged side elevational view of a portion of the device shown in FIG. 1, removed from the lawn mower.

FIG. 3 is an end view of the elements shown in FIG. 2, and is taken along the line 3—3 of FIG. 2.

FIG. 4 is an opposite side elevational view of the elements shown in FIG. 2, and is taken on the line 4—4 of FIG. 3.

FIG. 5 is an enlarged front elevational view of the upper elements shown in FIG. 1, removed from the mower.

FIG. 6 is an enlarged side elevational view of the elements shown in FIG. 5, and is taken along the line 6—6 of FIG. 5.

Referring now more particularly to the drawings, it will be understood that in the embodiment herein disclosed the reference character 7, in general, refers to a push-type, reel lawn mower which has a frame 8, roller 9, wheel 10, rubber tire 11 and handle attaching element 12, which is pivotably secured to the lawn mower, as in conventional practice. It will be understood that the handle attaching element 12 is part of a fork member to which a wooden handle is attached, or may be part of a tubular member which is bent and rebent to form part of the lawn mower handle. All of the elements just described are conventional and form no part of the within invention, except as combined with the elements which I will now describe.

The invention resides in the provision of a plate 13, which is formed with an integrated flange 14 and a lanced-out element 15, the latter being bent and rebent as shown in FIG. 4 to form a bracket to the inside face 15A of which is welded a nut 16. The edge 14A of the flange 14 rides on the frame and prevents the displacement of the plate 13 in one direction. The bracket 15 is provided with a bore in alignment with the opening in a nut 16, which is welded to the bracket 15. In the bore and opening is rotatably received a set screw 17, which has a knurled head 18 which may also be slotted (FIG. 4), for receiving a screwdriver. The bracket 15 is intended to be received over the edge of the frame member 8 and be secured thereto by means of the set screw 17. The integrated flange 14 is bored, as at 19 (FIG. 2), and has welded to it a nut 20, the threaded opening of which is in alignment with the bore 19. The bore 19 and the threaded opening of the nut 20 are arranged to receive an adjusting screw 21 which has a knurled finger grip 22. The upper end of the adjusting screw 21 has secured thereto, as at 23, a spring 24. The spring 24 is slidable in a guide member 25, which is formed by inwardly rolling one end of the plate 13, as shown in FIG. 4. Although, I show a tapered spring 24, it will be understood that a spring of uniform diameter may be employed as well. The upper end 26 of the spring 24 is loosely received in a cup-like element 27 (FIGS. 1, 5 and 6), which is mounted, as at 27A, to the lower end of a split bracket 28, which is arranged to be received around the member 12 and be secured thereto by means of a bolt and nut 29 and 30. It will be understood that the spring 24 and cup-like element 27 are not attached, but that the end of the spring 24 simply telescopes the cup-like element 27 and is held therein by the weight of the member 12 and its associated handle parts. This permits the handle to be pivoted to vertical position or beyond for storage purposes, or the like. By adjusting the screw 21 the spring is caused to move longitudinally, thereby effecting different degrees of angularity in the pivotal movement of the member 12. The adjustment is made to suit the proper angle of the lawn mower handle for each respective operator.

When the parts are in the position as shown in FIG. 1, it obvious that any shock, which is transmitted to the handle element 12 through the device embodying the invention, will be absorbed by the spring 24. By the same token, the member 12 will be held against further pivotal downward motion by means of the spring 24. Yet, the member 12 will be free to be pivoted toward the vertical position without limitation of the spring 24.

It is believed that the operation of the device is obvious from the foregoing description.

Having described by invention, what I claim and desire to secure by Letters Patent is:

1. The combination with a lawn mower having a frame and a pivotable handle, of a plate received on and secured to an edge portion of said frame, an inverted cup-like member attached to an element comprising part of said handle, and a compression spring interposed between said plate and said cup-like member one end of said spring being loosely received in said cup-like member, whereby to limit the downward pivoting of said handle but to permit the upward pivoting of said handle.

2. The combination with a lawn mower having a frame and a pivotable handle, of a plate received on and secured to an edge portion of said frame, an inverted cup-like member attached to an element comprising part of said handle, and a compression spring interposed between said plate and said cup-like member said plate having a lanced-out portion, which is bent and rebent to form a bracket, there being a threaded element on said bracket, a set screw received in said threaded element and arranged upon rotation to contact said frame to secure said plate to said frame.

3. The combination with a lawn mower having a frame and a pivotable handle, of a plate received on and secured to an edge portion of said frame, an inverted cup-like member attached to an element comprising part of said handle, and a compression spring interposed between said plate and said cup-like member said plate having an inturned flange, an opening in said flange having a nut in alignment therewith, an adjusting screw rotatable in said nut, one end of said screw being secured to one end of said spring, which upon rotation of the screw causes the longitudinal travel of said spring, and a member comprising part of said plate for guiding said spring in its longitudinal travel.

4. The combination with a lawn mower adding a frame and a pivotable handle, of a plate received on and secured to an edge portion of said frame, an inverted cup-like member attached to an element comprising part of said handle, and a compression spring interposed between said plate and said cup-like member said plate having an inturned flange, an edge of which rides on said frame and prevents the displacement in one direction of said plate.

References Cited in the file of this patent
UNITED STATES PATENTS

| | | |
|---|---|---|
| 1,754,741 | Cobb et al. | Apr. 15, 1930 |
| 2,707,641 | Mahr | May 3, 1955 |